United States Patent
Schoolcraft (10) Patent No.: US 9,856,929 B2
(45) Date of Patent: Jan. 2, 2018

(54) ELECTROMAGNETICALLY-ACTUATED DIRECTION-SENSING ROLLER CLUTCH

(71) Applicant: Allison Transmission, Inc., Indianopolis, IN (US)

(72) Inventor: Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 39 days.

(21) Appl. No.: 14/755,847

(22) Filed: Jun. 30, 2015

(65) Prior Publication Data

US 2015/0300425 A1    Oct. 22, 2015

Related U.S. Application Data

(62) Division of application No. 13/774,840, filed on Feb. 22, 2013, now Pat. No. 9,097,298.

(Continued)

(51) Int. Cl.
  *F16D 41/08*  (2006.01)
  *F16D 27/02*  (2006.01)
  *F16H 37/08*  (2006.01)

(52) U.S. Cl.
  CPC ......... *F16D 41/086* (2013.01); *F16D 27/02* (2013.01); *F16H 37/084* (2013.01)

(58) Field of Classification Search
  CPC .............................. F16D 27/02; F16D 41/086
  See application file for complete search history.

(56) References Cited

U.S. PATENT DOCUMENTS

| 2,410,818 A | 11/1946 | Grant, Jr. |
| 2,554,221 A | 5/1951 | Stephenson et al. |

(Continued)

FOREIGN PATENT DOCUMENTS

| CN | 101852258 A | 10/2010 |
| EP | 1519084 A2 | 9/2004 |

(Continued)

OTHER PUBLICATIONS

Examiner's First Report from the Australian Government for Application No. 2013222182, dated Mar. 23, 2016, 3 pages.

(Continued)

*Primary Examiner* — Jacob S. Scott
*Assistant Examiner* — Tinh Dang
(74) *Attorney, Agent, or Firm* — Barnes & Thornburg LLP (57) ABSTRACT

A roller clutch includes an outer race, an inner race, a first engagement member situated between the outer race and the inner race, a second engagement member situated between the outer race and the inner race, and an electromagnetic mover to be energized or de-energized. The first engagement member is configured to engage the outer race and the inner race to transmit torque between the outer race and the inner race in response to the electromagnetic mover being energized and the inner race applying negative torque to the second engagement member while the outer race applies positive torque to the second engagement member. The second engagement member is configured to engage the outer race and the inner race to transmit torque between the outer race and the inner race in response to the inner race applying positive torque to the second engagement member while the outer race applies negative torque to the second engagement member.

6 Claims, 6 Drawing Sheets

Related U.S. Application Data (60) Provisional application No. 61/602,255, filed on Feb. 23, 2012.

(56) References Cited

U.S. PATENT DOCUMENTS

| | | | |
|---|---|---|---|
| 2,583,843 A | 1/1952 | Herrick |
| 2,596,654 A | 5/1952 | Clark et al. |
| 2,718,292 A | 9/1955 | Meilander et al. |
| 2,841,330 A | 7/1958 | Brewer et al. |
| 3,324,744 A | 6/1967 | Roper |
| 3,432,016 A | 3/1969 | Vogt |
| 3,481,436 A | 12/1969 | Wilkowski |
| 3,631,741 A | 1/1972 | Kelbel |
| 4,114,478 A | 9/1978 | Clauss |
| 4,361,217 A | 11/1982 | Bieber et al. |
| 4,381,828 A | 5/1983 | Lunn et al. |
| 4,813,524 A | 3/1989 | Reik |
| 5,152,726 A | 10/1992 | Lederman et al. |
| 2,347,873 A | 5/1994 | Bloomfield |
| 5,355,981 A | 10/1994 | Itoh et al. |
| 5,407,024 A | 4/1995 | Watson et al. |
| 5,441,130 A | 8/1995 | Ha |
| 5,538,121 A | 7/1996 | Hering |
| 5,584,776 A | 12/1996 | Weilant et al. |
| 5,653,322 A | 8/1997 | Vasa |
| 5,662,198 A | 9/1997 | Kojima et al. |
| 5,704,867 A | 1/1998 | Bowen |
| 5,771,477 A | 6/1998 | Showalter et al. |
| 5,833,566 A | 11/1998 | Showalter |
| 5,884,526 A | 3/1999 | Fogelberg |
| 5,893,812 A | 4/1999 | Narai et al. |
| 5,918,715 A | 7/1999 | Ruth et al. |
| 5,992,592 A | 11/1999 | Showalter |
| 5,996,758 A | 12/1999 | Baxter |
| 6,062,361 A | 5/2000 | Showalter |
| 6,149,540 A | 11/2000 | Johnson et al. |
| 6,149,543 A | 11/2000 | Breen |
| 6,155,395 A | 12/2000 | Braford |
| 6,251,045 B1 | 6/2001 | Oliveira et al. |
| 6,460,671 B1 | 10/2002 | Karambelas et al. |
| 6,569,051 B2 | 5/2003 | Hirano et al. |
| 6,588,559 B2 | 7/2003 | Blair |
| 6,672,442 B2 | 1/2004 | Kato et al. |
| 6,679,367 B2 * | 1/2004 | Baker .................. F16D 41/067 192/219.3 |
| 6,790,153 B2 | 9/2004 | Goto |
| 6,834,750 B2 | 12/2004 | Baker et al. |
| 6,846,257 B2 | 1/2005 | Baker et al. |
| 7,052,430 B2 | 5/2006 | Stevenson et al. |
| 7,189,182 B2 | 3/2007 | Stevenson et al. |
| 7,204,337 B2 | 4/2007 | Wildfellner |
| 7,219,569 B2 | 5/2007 | Jastrzembowski et al. |
| 7,874,413 B2 | 1/2011 | Saito et al. |
| 8,152,673 B2 | 4/2012 | Yanay |
| 8,298,112 B2 | 10/2012 | Takada |
| 9,103,384 B2 * | 8/2015 | Akiyoshi .............. F16D 41/105 |
| 9,334,926 B2 * | 5/2016 | Takahashi .............. F02D 15/02 |
| 2002/0005325 A1 | 1/2002 | Yamada |
| 2002/0037786 A1 | 3/2002 | Hirano et al. |
| 2003/0019708 A1 | 1/2003 | Shiro et al. |
| 2003/0051959 A1 | 3/2003 | Blair |
| 2003/0226415 A1 | 12/2003 | Baker et al. |
| 2004/0104096 A1 | 6/2004 | Genise |
| 2004/0116226 A1 | 6/2004 | Baker et al. |
| 2005/0133329 A1 | 6/2005 | Gradu et al. |
| 2010/0314212 A1 | 12/2010 | Akiyoshi et al. |
| 2013/0220759 A1 | 8/2013 | Schoolcraft |

FOREIGN PATENT DOCUMENTS

| | | |
|---|---|---|
| WO | 1998049455 A2 | 11/1998 |
| WO | 2010048029 A2 | 4/2010 |

OTHER PUBLICATIONS

Search Report and Written Opinion from the State Intellectual Property Office for the People's Republic of China for Application No. 201380020261.3, dated Mar. 22, 2016, 19 pages.

European Search Report and Written Opinion for Application No. 13751648.0, dated May 19, 2016, 7 pages.

Search Report and Written Opinion from the State Intellectual Property Office for the People's Republic of China for Application No. 201380020235.0, dated Apr. 27, 2016, 11 pages.

International Preliminary Report on Patentability for Application No. PCT/US2013/027472, dated Nov. 11, 2014, 8 pages.

Second Office Action from the State Intellectual Property Office for the People's Republic of China for Application No. 201380020235.0, dated Jan. 6, 2017, 10 pages.

International Search Report and Written Opinion received for PCT International Application No. PCT/US2013/027468, dated May 9, 2013, 10 pages.

Patent Examination Report for Australian Application No. 2013222178, dated May 27, 2016, 3 pages.

Examination Report from the European Patent Office for Application No. 13751648.0-1503, dated Oct. 16, 2017, 5 pages.

* cited by examiner

ELECTROMAGNETICALLY-ACTUATED DIRECTION-SENSING ROLLER CLUTCH

CROSS-REFERENCE TO RELATED U.S. PATENT APPLICATION

This application is a divisional application of and claims priority to U.S. application Ser. No. 13/774,840, entitled "ELECTROMAGNETICALLY-ACTUATED DIRECTION-SENSING ROLLER CLUTCH," which was filed on Feb. 22, 2013 and which claims priority under 35 U.S.C. §119(e) to U.S. Provisional Patent Application Ser. No. 61/602,255, filed on Feb. 23, 2012. The above applications are incorporated herein by this reference in their entireties.

TECHNICAL FIELD

The present disclosure relates generally to roller clutches, and more particularly, to a direction-sensing roller clutch for use in a transmission.

BACKGROUND

Transmissions are used to transfer a drive torque from a drive unit to a load. For example, a vehicle transmission transfers the drive torque from the vehicle engine to the vehicle load. Some transmissions include a finite set of gears, which may be selected to produce a specific transmission ratio. Other transmissions may include a ratio varying unit ("variator") to provide a substantially continuous variation of transmission ratio rather than a series of predetermined transmission ratios. Such transmissions are typically referred to as continuously variable transmissions (CVTs), infinitely variable transmissions (IVTs), toroidal transmissions, and/or the like.

Typical transmissions include one or more clutches. One type of clutch that may be used in a transmission, as well as other devices is known as a roller clutch. Conventional roller clutches can be used as one-way or overrunning clutches to allow freewheeling of an output (e.g., an output shaft) relative to an input (e.g., an input shaft) depending on the torque interaction of the input and output. For example, vehicle transmissions may include one-way clutches, such as a roller clutch, sensitive to torque differentials to connect an input shaft to an output shaft to allow freewheeling of a drive train between a drive unit and a vehicle load when direct connection of the drive unit to the vehicle load is undesirable. Similar devices such as sprag clutches and ratchets can also be used to provide one-way or overrunning clutch relationships between inputs and outputs.

SUMMARY

According to one aspect of the present disclosure, a transmission is disclosed. The transmission may include a rotational receiver, a variable transmission unit, and a direction-sensing roller clutch. The direction-sensing roller clutch may include an inner race coupled to one of the rotational receiver or the variable transmission unit, an outer race coupled to the other of the rotational receiver or the variable transmission unit, and an electromagnetic mover to be energized or de-energized. The direction-sensing roller clutch may be configured to transmit torque between the inner race and the outer race so that torque is transmitted between the rotational receiver and the variable transmission unit in response to the rotational receiver turning in a positive direction and applying positive torque or in response to the electromagnetic mover being energized.

In some embodiments, the direction-sensing roller clutch may include a first engagement member situated between the outer race and the inner race. The first engagement member may be moved into contact the outer race and the inner race to transmit torque between the outer race and the inner race when the rotational receiver is rotated in the positive direction.

The direction-sensing roller clutch may include a second engagement member situated between the outer race and the inner race. The second engagement member may be configured to transmit torque between the outer race and the inner race in response to the rotational receiver applying positive torque while the variable transmission unit applies negative torque.

In some embodiments, the direction-sensing roller clutch may include an actuator configured to move the first engagement member into contact with the outer race and the inner race. The actuator may move the first engagement member into contact with the outer race and the inner race in response to the electromagnetic mover being energized.

In some embodiments, the transmission may include an electro-hydraulic control system. The electro-hydraulic control system may be configured to energize the electromagnetic mover. The electro-hydraulic control system may include a sensor configured to detect the direction of rotation of the rotational receiver. The electromagnetic mover may include a plurality of electromagnets coupled for common rotation with the inner race. The electro-hydraulic control system may be coupled to the electromagnetic mover by a slip ring.

According to another aspect of the present disclosure, a roller clutch may include an outer race, an inner race, a first engagement member situated between the outer race and the inner race, a second engagement member situated between the outer race and the inner race, and an electromagnetic mover to be energized or de-energized. The first engagement member may be configured to engage the outer race and the inner race to transmit torque between the outer race and the inner race in response to the electromagnetic mover being energized and the inner race applying negative torque to the first engagement member while the outer race applies positive torque to the first engagement member. The second engagement member may be configured to engage the outer race and the inner race to transmit torque between the outer race and the inner race in response to the inner race applying positive torque to the second engagement member while the outer race applies negative torque to the second engagement member.

In some embodiments, the roller clutch may include an actuator. The actuator may be configured to move the first engagement member into contact with at least one of the outer race and the inner race.

The first engagement member may be biased away from engagement with at least one of the outer race and the inner race by a first spring. The second engagement member may be biased toward engagement with the outer race and the inner race by a second spring.

In some embodiments, electromagnetic mover may be energized in response to the inner race turning in a positive direction. The electromagnetic mover may be de-energized in response to the inner race turning in a negative direction.

It is contemplated that the actuator may include a paddle. The paddle may be formed from a ferromagnetic material radially aligned with the electromagnetic mover.

According to another aspect of the present disclosure, a drive train for driving a load is taught. The drive train may include a drive unit with a drive unit output shaft; and a transmission coupled to the drive unit. The transmission may be configured to transfer torque between the drive unit and the load unless the drive unit output shaft turns in a negative direction and applies a negative torque to the transmission.

In some embodiments, the transmission may include a variable transmission unit and a direction-sensing roller clutch coupled between the drive unit and the variable transmission unit. The direction-sensing roller clutch may include an inner race coupled for common rotation with one of the drive unit output shaft or a variable transmission unit input shaft, an outer race coupled for common rotation with the other of the drive unit output shaft or the variable transmission unit input shaft, a clutch engagement assembly situated between the inner race and the outer race, and an electromagnet configured to be energized or de-energized.

It is contemplated that the clutch engagement assembly may include a first engagement member. The first engagement member may be configured to transmit torque between the drive unit output shaft and the variable transmission input shaft only in response to the electromagnet being energized and the drive unit output shaft applying torque in the negative direction.

The clutch engagement assembly may include a second engagement member. The second engagement member may be configured to transmit torque between the drive unit output shaft and the variable transmission input shaft in response to the drive unit output shaft applying torque in the positive direction while the variable transmission input shaft applies torque in the negative direction.

In some embodiments, the direction-sensing roller clutch may include an actuator configured to move the first engagement member into contact with the outer race and the inner race. The actuator may move the first engagement member into contact with the outer race and the inner race in response to a sensor detecting that the drive unit output shaft is turning in a positive direction. The actuator may move the first engagement member into contact with the outer race and the inner race in response to the electromagnet being energized. The electromagnet may be coupled for rotation with the inner race of the clutch engagement assembly.

DESCRIPTION OF THE DRAWINGS

The systems and methods described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
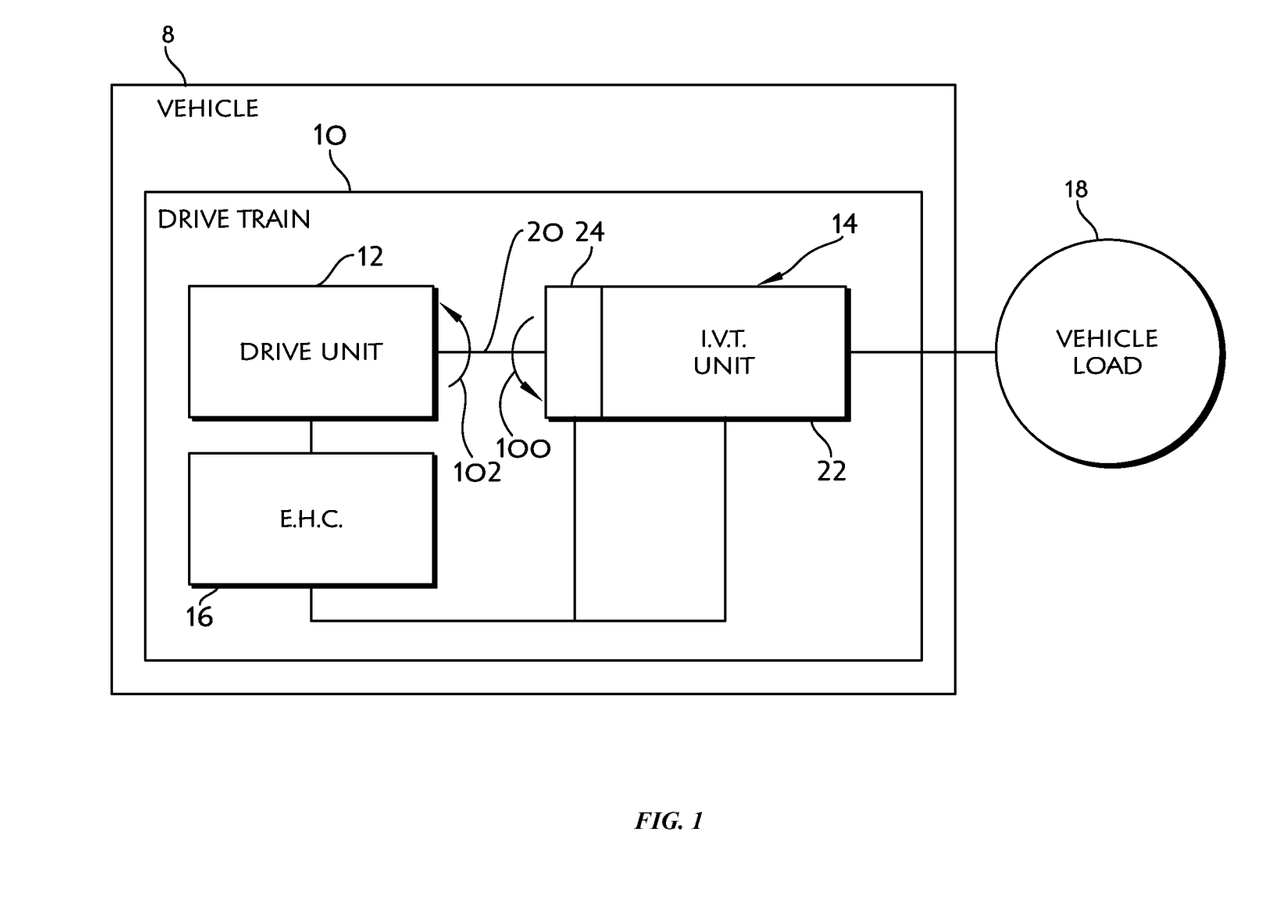
FIG. 1 is a diagrammatic view of at least one embodiment of a vehicle drive train including a drive unit, a transmission, and an electro-hydraulic control.

Referring to FIG. 1, in one embodiment, a drive train 10 of a vehicle 8 includes a drive unit 12 and a transmission 14 configured to drive a vehicle load 18. The drive train 10 also includes an electro-hydraulic control system 16 coupled to the drive unit 12 and the transmission 14 to coordinate the operation of the drive unit 12 and the transmission 14 as discussed in more detail below. Additionally, in some embodiments, the drive train 10 may include other components commonly found in drive trains but not illustrated in FIG. 1 in order to increase clarity of the present description.

The drive unit 12 is illustratively embodied as a diesel internal combustion engine. However, in other embodiments, the drive unit 12 may be embodied as a spark-ignition type internal combustion engine (i.e. gasoline engine), a hybrid engine-electric motor combination, or another source of rotational power. The drive unit 12 includes a drive unit output shaft 20 that provides rotational power to the transmission 14. As a convention throughout this description, the term "positive direction" refers to a clockwise direction when looking from the drive unit 12 toward the transmission 14 as indicated by an arrow 100 in FIG. 1. The term "negative direction" refers to a counter-clockwise direction when looking from the drive unit 12 toward the transmission 14 indicated by an arrow 102 in FIG. 1. This convention will be used when referring to the direction of either speed or torque.

The transmission 14 is operable to transmit the rotational power from the drive unit 12 to the vehicle load 18 at various transmission ratios. The transmission ratio provided by the transmission 14 is controlled by the electro-hydraulic control system 16. For example, the electro-hydraulic control system 16 is configured to modify the transmission ratio during operation so that the drive unit 12 operates at an optimized set of as a function of the vehicle load 18 and the speed of the vehicle 8.

Figure 2:
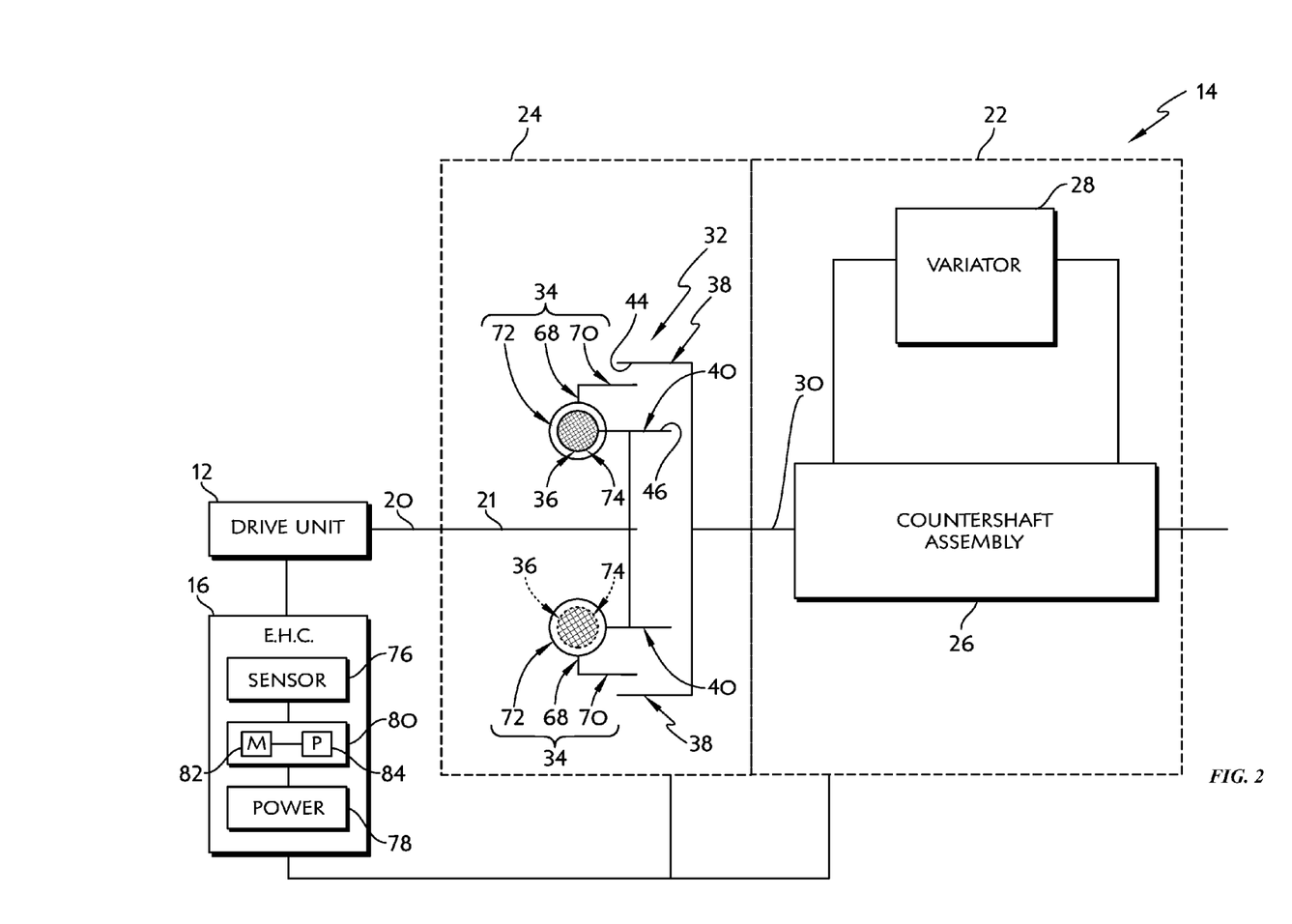
FIG. 2 is a schematic diagram of at least one embodiment of the transmission setoff of the vehicle drive train of FIG. 1.

As shown in FIG. 2, the transmission 14 illustratively includes a rotational receiver 21, a variable transmission unit 22, and a direction-sensing roller clutch 24 configured to prevent or otherwise resist the drive unit 12 from driving the variable transmission unit 22 in a negative direction. The rotational receiver 21 may be embodied as an input shaft, gear, coupling, sprocket, or other device capable of coupling with the drive unit output shaft 20 for common rotation therewith. As such, the rotational receiver 21 may form an integral part of the direction-sensing roller clutch 24 in some embodiments or may be embodied as a component of the drive train 10 separate from the direction-sensing roller clutch 24 but coupled therewith. The variable transmission unit 22 is illustratively embodied as an infinitely variable countershaft transmission unit. However, in other embodiments, the variable transmission unit 22 may be embodied as a continuously variable transmission unit or a "standard" transmission unit configured to provide a finite number of geared ratios. The direction-sensing roller clutch 24 couples the drive unit 12 to the variable transmission unit 22 via the rotational receiver 21 so that torque is transferred between the drive unit 12 and the variable transmission unit 22 through the direction-sensing roller clutch 24, except in situations wherein the drive unit output shaft 20 turns in a negative direction and applies negative torque to the direction-sensing roller clutch 24. For example, such a situation may occur immediately after shutdown of a diesel engine wherein pressure built up in the cylinders of the engine resists positive rotation and produces a "kick back."

The variable transmission unit 22 includes a countershaft assembly 26 and a variator 28 as shown diagrammatically in FIG. 2. The illustrative variable transmission unit 22 has a variable forward speed mode, a variable reverse speed mode, and a driven neutral mode. The countershaft assembly 26 is coupled to the direction-sensing roller clutch 24 by a variable transmission input shaft 30 that turns in a positive direction to drive the variable transmission unit 22 during operation of the transmission 14. The variator 28 is illustratively embodied as a toroidal variator having a plurality of rollers. However, in other embodiments, the variator 28 may be embodied as a friction-cone type variator or another suitable variable transmission configuration. The countershaft assembly 26 and the variator 28 cooperate to provide a substantially infinitely variable transmission unit. As with typical variable transmission units, rotation of the variable transmission input shaft 30 in a negative direction could result in the reversal of the variator 28, which may damage rollers, cones, or other components of the variator 28. As such, the direction-sensing roller clutch 24 is configured to prevent or otherwise restrict such negative rotation as discussed in more detail below.

The direction-sensing roller clutch 24 includes a clutch engagement assembly 32, an engagement actuator 34, and an electromagnetic mover 36 as shown in FIG. 2. The clutch engagement assembly 32 transmits torque between the rotational receiver 21 of the transmission 14 and the variable transmission input shaft 30 when the clutch engagement assembly 32 is engaged. The clutch engagement assembly 32 is biased toward engagement when the drive unit output shaft 20 applies a positive torque to the rotational receiver 21 of the transmission 24 and biased out of engagement when the drive unit output shaft 20 applies a negative torque. However, as discussed in more detail, the engagement actuator 34 is configured to move the clutch engagement assembly 32 to an engaged configuration when the drive unit output shaft 20 applies a negative torque but is turning in the positive direction thereby making direction-sensing roller clutch 24 direction-sensitive.

Figure 3:
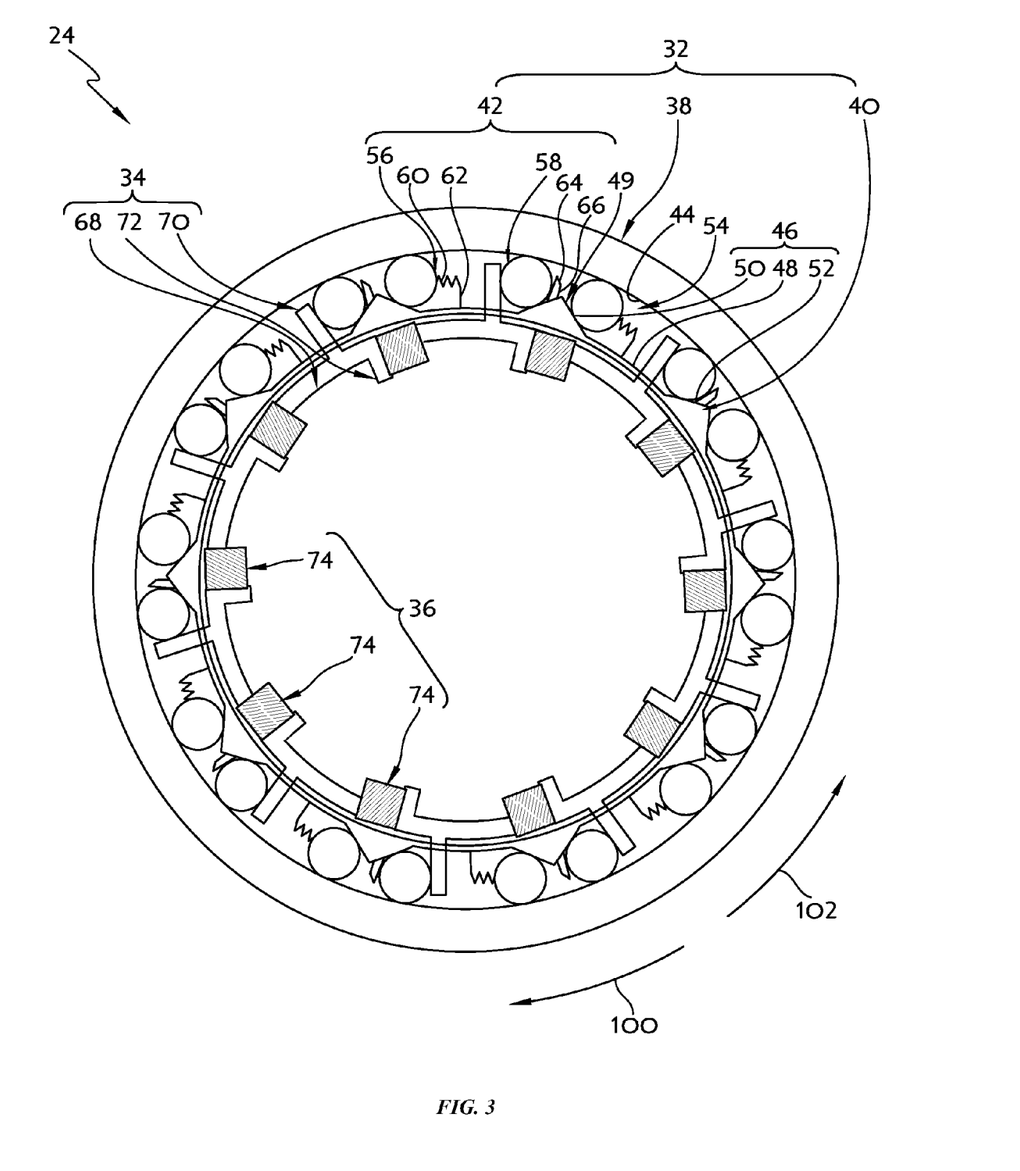
FIG. 3 is an axial, elevation view of at least one embodiment of a direction-sensing roller clutch of the transmission of FIG. 2.

As shown in FIG. 3, the clutch engagement assembly 32 includes an outer race 38, an inner race 40, and a plurality of roller sets 42. The outer race 38 is coupled to the variable transmission input shaft 30 for common rotation therewith. Similarly, the inner race 40 is coupled to the rotational receiver 21 for common rotation therewith. The plurality of roller sets 42 are situated between the outer race 38 and the inner race 40.

The outer race 38 is formed to include a cylindrical inner surface 44. The inner race 40 is formed to include an outer surface 46 opposite the cylindrical inner surface 44 of the outer race 38. The outer surface 46 of the inner race 40 includes a series of arcuate sections 48 defined between spaced-apart ramped protrusions 49. Each ramped protrusion 49 includes a forward ramp section 50 (i.e., the left side of the ramped protrusion 49 when looking from the drive unit 12 toward the direction-sensing roller clutch 24) and a rearward ramp section 52 (i.e., the right side of the ramped protrusion 49 when looking from the drive unit 12 toward the direction-sensing roller clutch 24). The outer race 38 and the inner race 40 are positioned such that each arcuate section 48, forward ramp section 50, and rearward ramp section 52 of the inner race 40 forms a pocket 54 between the inner surface 44 of the outer race 38 and the outer surface 46 of the inner race 40.

A roller set 42 is positioned in each pocket 54 between the outer race 38 and the inner race 40 as shown in FIG. 3. Each roller set 42 includes a forward roller 56 and a rearward roller 58. The forward roller 56 is biased by a biasing member 60, illustratively a spring, toward contact with the inner surface 44 of outer race 38 and the forward ramp section 50 of the inner race 40. Each spring 60 is coupled to a spring support 62 which is fixed to the inner race 40. Each rearward roller 58 is biased by a spring 64 away from contact with the inner surface 44 of outer race 38 and a rearward ramp section 52 of inner race 40. The spring 64 is coupled to a spring support 66 which is fixed to the inner race 40. By biasing the rearward rollers 58 away from contact with the outer race 38 and the inner race 40, the clutch engagement assembly 32 is biased away from engagement when the drive unit output shaft 20 applies a negative torque to the direction-sensing roller clutch 24. The engagement actuator 34 and the electromagnetic mover 36 cooperate to overcome the biasing force of the spring 64 so that the clutch engagement assembly 32 is engaged when the drive unit output shaft 20 turns in the positive direction.

Referring back to FIG. 2, the engagement actuator 34 is formed to include an actuator ring 68, a plurality of actuation members or fingers 70, and one or more paddles 72. The fingers 70 extend axially from the actuator ring 68 toward the clutch engagement assembly 34. The paddles 72 illustratively extend radially inward from the actuator ring 68 and are formed from a ferromagnetic material. The actuator ring 68 supports the actuation fingers 70. Each actuation finger 70 extends into a pocket 54 and is configured to move between an activated position and a deactivated position. It should be appreciated that although the illustrative embodiment of FIG. 2 includes a plurality of paddles 72, a single paddle 72 may be used in some embodiments.

In the activated position, shown in FIG. 3, each actuation finger 70 contacts a corresponding rearward roller 58 overcoming the biasing force of the spring 64 to move the corresponding rearward roller 58 into contact with the inner surface 44 of the outer race 38 and a rearward ramp section 52 of the inner race 40. Conversely, in the deactivated position, each actuation finger 70 is moved out of contact with or otherwise positioned to allow the corresponding rearward roller 58 to be pushed out of contact with the inner surface 44 of the outer race 38 and a rearward ramp section 52 of the inner race 40 by the spring 64.

The electromagnetic mover 36 is configured to cooperate with the electro-hydraulic controller 16 to move the actuator 34 to the activated position when the drive unit output shaft 20 turns in a positive direction and to the deactivated position when the drive unit output shaft 20 turns in a negative direction. The electromagnetic mover 36 rotates with the inner race 40 of the clutch engagement assembly 32 and with the rotational receiver 21. In the illustrative embodiment, the electromagnetic mover 36 is embodied as a plurality of electromagnets 74 that extend axially from the inner race 40 of the clutch engagement assembly 32. Each electromagnet 74 is radially aligned with a corresponding paddle 72 of the engagement actuator 34. Each electromagnet 74 is configured to be energized, thereby exerting an attractive force on the corresponding paddle 72, and de-energized, thereby exerting substantially no force on the corresponding paddle 72. In some embodiments, the electromagnetic mover 36 may be embodied as a single electromagnet 34 corresponding to a single paddle 72 as discussed above.

Figure 5A:
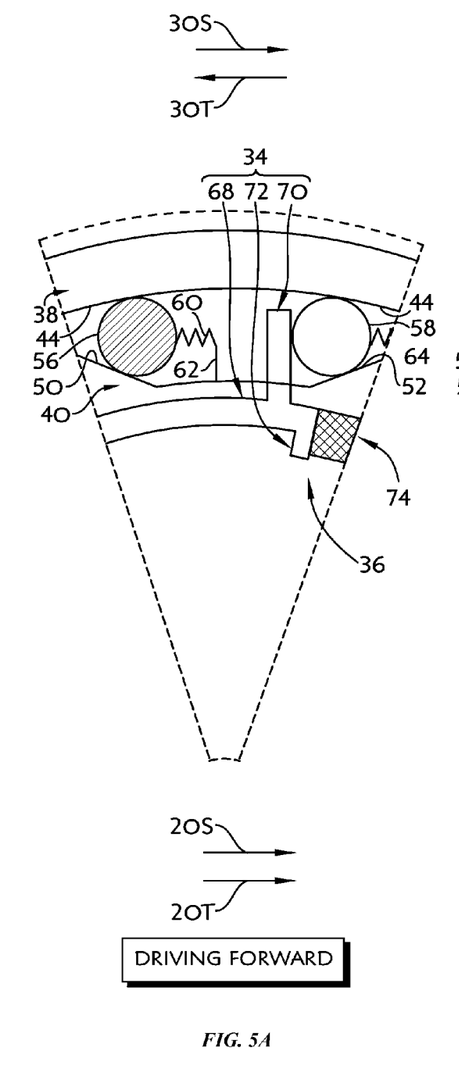
FIG. 5A is an axial view of at least one embodiment of a segment of the direction-sensing roller clutch of FIG. 3 showing the arrangement of the direction-sensing roller clutch when the vehicle power train is in a driving forward mode of operation.
Figure 5B:
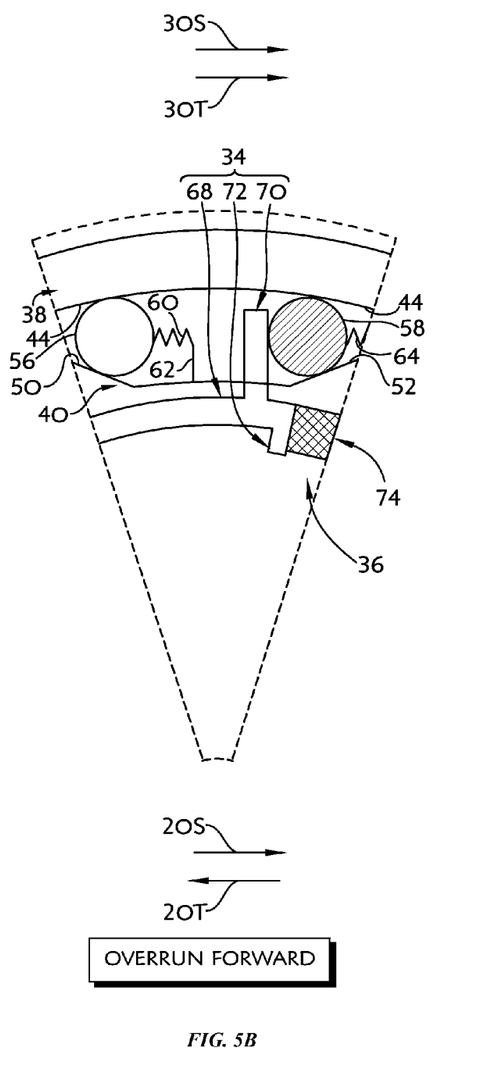
FIG. 5B is an axial view of at least one embodiment of the segment of the direction-sensing roller clutch of FIG. 5A showing the arrangement of the direction-sensing roller clutch when the vehicle power train is in an overrun forward mode of operation wherein the drive unit is overrun by the transmission in a positive direction of rotation.

When the electromagnets 74 of the electromagnetic mover 36 are energized, the engagement actuator 34 is moved to the activated position in response to the paddles 72 of the engagement actuator 32 being pulled into contact with the electromagnets 74 as shown, for example, in FIGS. 5A and 5B. When the electromagnets 74 of the electromagnetic mover 36 are de-energized, the engagement actuator 34 is moved to the deactivated position by the spring 64 as shown, for example, in FIGS. 5C and 5D. The electro-hydraulic controller 16 may be configured to energize and de-energize the electromagnets 74.

The electro-hydraulic control system 16 illustratively includes a sensor 76, a power source 78, and a controller 80. The sensor 76 is illustratively a sensor configured to determine the direction of rotation of the drive unit output shaft 20. The sensor 76 may be embodied as, for example, an accelerometer coupled to the drive unit output shaft 20 or to the rotational receiver 21. The sensor 76 is communicatively coupled to the controller 80. The power source 78 is coupled to the controller 80 and provides power to energize the electromagnets 74 of the electromagnetic mover 34.

The controller 80 illustratively includes a memory 82 containing instructions and a processor 84 coupled to the memory 82 to execute the instructions stored therein. The memory 82 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The processor 84 may be embodied as any type of processor capable of executing the instructions stored in the memory 82. The illustrative processor 84 is a single core processor, but processors having multiple cores may be used in other embodiments.

When the processor 82 executes the instructions stored in the memory 84, the controller 80 is configured to couple the power source 78 to the electromagnets 74 in response to the sensor 76 indicating that the drive unit output shaft 20 is turning in the positive direction and to disconnect the power source 78 from the electromagnets 74 in response to the sensor 76 indicating that the drive unit output shaft is turning in the negative direction. Thus, the electromagnets 74 of the electromagnetic mover 72 are energized when the drive unit output shaft 20 turns in the positive direction and are de-energized when the drive unit output shaft 20 turns in the negative direction.

Figure 4:
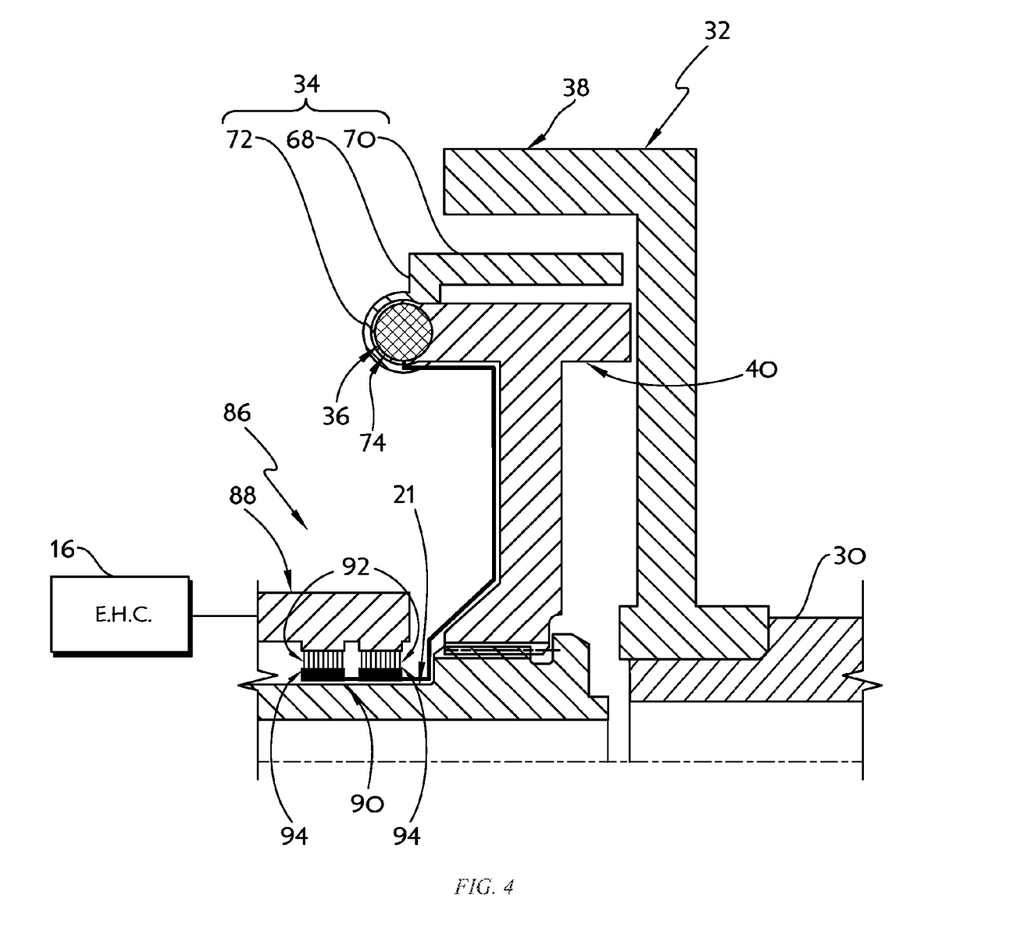
FIG. 4 is a detailed cross-sectional view of the direction-sensing roller clutch of FIG. 3.

Referring now to FIG. 4, the electro-hydraulic control system 16 is electrically coupled to the electromagnets 74 via a slip ring 86. The slip ring 86 illustratively includes a stationary arm 88 and a rotating platform 90. The stationary arm 88 includes a number of brushes 92 electrically coupled to the electro-hydraulic control system 16. The rotating platform 90 is illustratively coupled for rotation with the rotational receiver 21 and includes a number of rings 94 electrically coupled to the electromagnets 74. The brushes 92 contact the rings 94 to electrically couple the elector-hydraulic control system 16 with the electromagnets 74. In other embodiments, inductive transmission may be used to electrically couple the electro-hydraulic control system 16 with the electromagnets 74.

Referring back to FIG. 5A, a drive forward mode of drive train 10 is shown wherein the drive unit 12 drives the transmission 14 in a positive direction. The clutch engagement assembly 32 is engaged during the drive forward mode so that power from the drive unit 12 can be used to move the vehicle load 18. In the drive forward mode, the drive unit 12 drives the transmission 14 by applying torque to the rotational receiver 21 and the direction-sensing roller clutch 24 in a positive direction through the drive unit output shaft 20 as indicated by arrow 20T. A reactionary torque is applied in a negative direction by the variable transmission input shaft 30 to the direction-sensing roller clutch 24 as indicated by arrow 30T. As the drive unit 12 drives the transmission 14 in the positive direction, the drive unit output shaft 20 rotates in a positive direction as indicated by arrow 20S and the transmission input shaft 30 rotates in a positive direction as indicated the by arrow 30S.

Each forward roller 56 of the clutch engagement assembly 32 contacts and engages the outer race 38 and the inner race 40 such that that the clutch engagement assembly 32 is engaged during the drive forward mode. Each forward ramp section 50 of the inner race 40 urges the corresponding forward roller 56 toward the outer race 38 in response to the torque interaction of between inner race 40 (coupled to the rotational receiver 21 and the drive unit output shaft 20) and outer race 38 (coupled to the transmission input shaft 30).

The forward roller 56 is thereby wedged between the outer race 38 and the inner race 40. Torque is transmitted through the forward roller 56 between the outer race 38 and the inner race 40 when the forward roller 56 is wedged between the outer race 38 and the inner race 40 as indicated by the shading of forward roller 56 in FIG. 5A.

The rearward roller 58 of the clutch engagement assembly 32 is moved into contact with the outer race 38 and inner race 40 by the engagement actuator 34 and the electromagnetic mover 36 during drive forward mode as shown in FIG. 5A. The electromagnetic mover 36 is energized and the engagement actuator 34 is moved to the activated position so that the rearward roller 58 contacts outer race 38 and the inner race 40 in response to the drive unit output shaft 20 being rotated in the positive direction. However, the torque interaction of the inner race 40 and the outer race 38 does not force the rearward roller 58 to be wedged between the outer race 38 and the inner race 40. As such, torque is not transmitted by the rearward roller 58 when the drive train 10 is in drive forward mode.

Referring again to FIG. 5B, an overrun forward mode of the drive train 10 is shown wherein the drive unit 12 is overrun (or outpaced) by the transmission 14 in a positive direction. Such a situation may occur when, for example, the vehicle 8 is traveling down a hill and the vehicle 8 is accelerated by gravity. The clutch engagement assembly 32 is engaged during overrun forward mode so that the drive unit 12 can slow the transmission 14. In overrun forward mode, the transmission 14 drives the drive unit 12 by applying torque to the direction-sensing roller clutch 24 in a positive direction through the transmission input shaft 30 as indicated by arrow 30T. A reactionary torque is applied in a negative direction by the drive unit output shaft 20 to the rotational receiver 21 and the direction-sensing roller clutch 24 as indicated by arrow 20T. As the transmission 14 drives the drive unit 12 in the positive direction, the transmission input shaft 30 rotates in a positive direction as indicated by arrow 30S and the drive unit output shaft 20 rotates in a positive direction as indicated by arrow 20S.

During the engine overrun forward mode, the forward rollers 56 of the clutch engagement assembly 32 contact the outer race 38 and the inner race 40 as shown in FIG. 5B. However, the torque interaction of the inner race 40 and the outer race 38 does not force the forward rollers 56 to be wedged between the outer race 38 and the inner race 40. As such, torque is not transmitted by the forward rollers 56 when the drive train 10 is in engine overrun forward mode.

Additionally, during the engine overrun forward mode, the rearward rollers 58 of the clutch engagement assembly 32 are moved into contact with the outer race 38 and the inner race 40 by the engagement actuator 34 as shown in FIG. 5B. Because the drive unit output shaft 20 is rotating in the positive direction, the electromagnetic mover 36 is energized and the engagement actuator 34 activates the rearward rollers 58 so that the rearward rollers 58 contact the outer race 38 and the inner race 40. The rearward rollers 58 engage the races 38, 40 so that the clutch engagement assembly 32 is engaged in engine overrun forward mode. The rearward ramp sections 52 of the inner race 40 urge the rearward rollers 58 toward the outer race 38 in response to the torque interaction of the inner race 40 (coupled to rotational receiver 21 and drive unit output shaft 20) and the outer race 38 (coupled to transmission input shaft 30). The rearward rollers 58 are resultantly wedged between the outer race 38 and the inner race 40. Torque is transmitted through the rearward rollers 58 between the outer race 38 and the inner race 40 when the rearward rollers 58 are wedged between the outer race 38 and the inner race 40 as indicated by the shading of rearward roller 58 in FIG. 5B.

Referring again to FIG. 5C, a driving backward, or "kickback," mode which may be experienced by the drive train 10 is shown. Such a set of conditions may be applied to the direction-sensing roller clutch 24, for example, immediately after a diesel engine drive unit 12 is shut down. At shut down, the pressures built up in a diesel engine may overcome the frictional forces in the engine and cause negative rotation of the drive unit output shaft 20. In the driving backward mode, the drive unit 12 attempts to drive the transmission 14 in a negative direction by rotating the drive unit output shaft 20 in a negative direction as indicated by arrow 20S. Rotation of the drive unit output shaft 20 in the negative direction applies torque to the rotation receiver 21 and to the direction-sensing roller clutch 24 in a negative direction as indicated by arrow 20T. When the drive unit output shaft 20 turns in the negative direction, the electromagnetic mover 36 is energized and the clutch engagement assembly 32 of the direction-sensing roller clutch 24 is disengaged. Thus, during the driving backward mode, the drive unit output shaft 20 freewheels relative to the variable transmission unit 22. Preventing the drive unit 12 from driving the transmission 14 in the negative direction during the driving backward mode may avoid damage to the variable transmission unit 22.

Figure 5C:
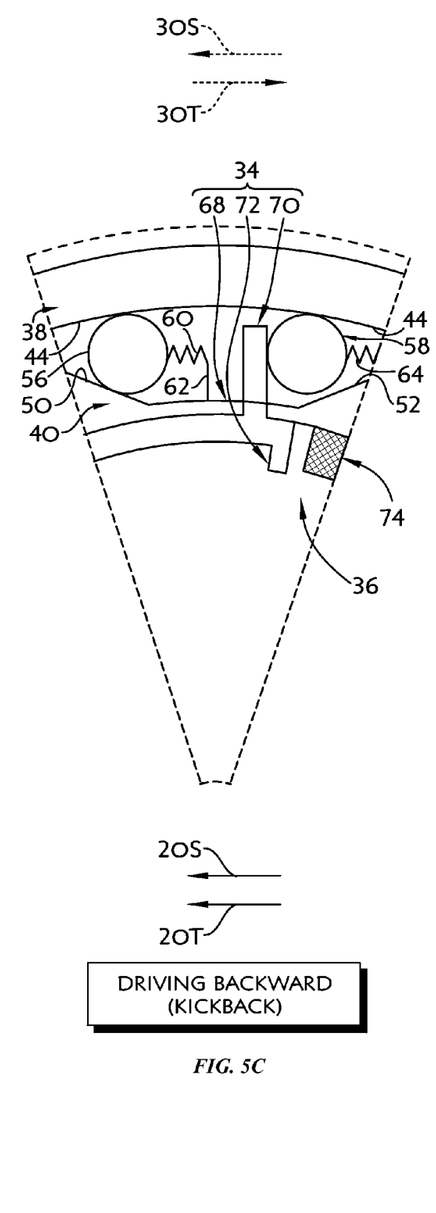
FIG. 5C is an axial view of at least one embodiment of the segment of the direction-sensing roller clutch of FIG. 5A showing the arrangement of the direction-sensing roller clutch when the vehicle power train is in a driving backward (or kickback) mode of operation wherein the drive unit attempts to drive the transmission in a negative direction of rotation.

The forward rollers 56 of the clutch engagement assembly 32 contact the outer race 38 and the inner race 40 during driving backward mode as shown in FIG. 5C. However, the torque interaction of the inner race 40 and the outer race 38 does not force the forward roller 56 to be wedged between the outer race 38 and the inner race 40 and torque is not transmitted by the forward roller 56 when the drive train 10 is in the driving backward mode.

Additionally, during the driving backward mode, the rearward roller 58 of the clutch engagement assembly 32 is moved out of contact with the outer race 38 and/or the inner race 40 by the spring 64 as shown in FIG. 5C. Because the drive unit output shaft 20 is rotated in the negative direction, the electromagnetic mover 36 is de-energized and the engagement actuator 34 is moved to the deactivated position so that the rearward roller 58 is free to move out of contact with the outer race 38 and/or the inner race 40. Since the rearward roller 58 is out of contact with the outer race 38 and the inner race 40, the rearward roller 58 does not transmit torque between the outer race 38 and/or the inner race 40.

Referring again to FIG. 5D, an overrun backward mode of the drive train 10 is shown. In the overrun backward mode, the drive unit 12 is overrun (or outpaced) by the transmission 14 in a negative direction. Such a situation may occur when, for example, the vehicle 8 is fully loaded and stopped on an incline and is rolled backward down the incline by gravity. The clutch engagement assembly 32 is engaged during the overrun backward mode so that the drive unit 12 can slow the transmission 14. In the overrun backward mode, the transmission 14 drives the drive unit 12 by applying torque to the direction-sensing roller clutch 24 in a negative direction through transmission input shaft 30 as suggested by arrow 30T. A reactionary torque is applied in a positive direction by drive unit output shaft 20 to direction-sensing roller clutch 24 as suggested by arrow 20T. As the transmission 14 drives the drive unit 12 in the negative direction, the transmission input shaft 30 rotates in a negative direction as indicated by arrow 30S and the drive unit output shaft 20 rotates in a negative direction as indicated by arrow 20S.

The forward roller 56 of the clutch engagement assembly 32 contacts and engages the outer race 38 and the inner race 40 so that the clutch engagement assembly 32 is engaged during overrun backward mode. The forward ramp section 50 of the inner race 40 urges the forward roller 56 toward the outer race 38 in response to the torque interaction of the inner race 40 and the outer race 38 so that the forward roller 56 is wedged between the outer race 38 and the inner race 40. Torque is transmitted through the forward roller 56 between the outer race 38 and the inner race 40 when the forward roller 56 is wedged between the outer race 38 and the inner race 40 as indicated by the shading of the forward roller 56 in FIG. 5D.

Figure 5D:
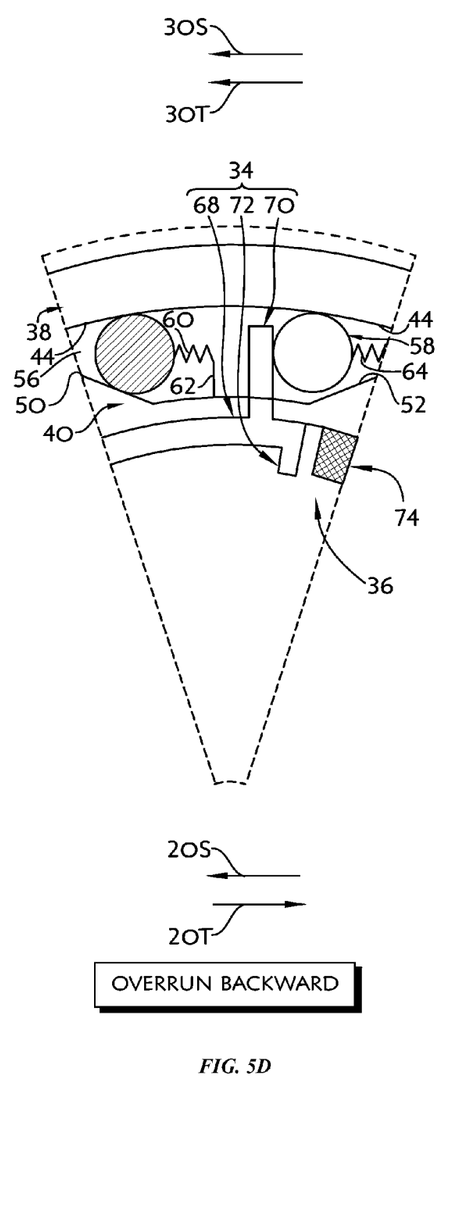
FIG. 5D is an axial view of at least one embodiment of the segment of the direction-sensing roller clutch of FIG. 5A showing the arrangement of the direction-sensing roller clutch when the vehicle power train is in an overrun backward mode of operation wherein the drive unit is overrun by the transmission in a negative direction of rotation.

Additionally, during the overrun backward mode, the rearward roller 58 of the clutch engagement assembly 32 is moved out of contact with the outer race 38 and/or the inner race 40 by the spring 64 as shown in FIG. 5D. Because the drive unit output shaft 20 is rotated in the negative direction (even slightly), the electromagnetic mover 36 is de-energized and the engagement actuator 34 is moved to the deactivated position so that the rearward roller 58 is out of contact with the outer race 38 and/or the inner race 40. Since the rearward roller 58 is out of contact with the outer race 38 and/or the inner race 40, the rearward roller 58 does not transmit torque between the outer race 38.

It should be understood that the direction-sensing roller clutch 24 of the present disclosure may be used in other applications wherein single-mode freewheeling of a driver shaft relative to a driven shaft is desired. Specifically, the direction-sensing roller clutch 24 may be incorporated in applications in which it is desirable to (i) disconnect a driver shaft from a driven shaft when the driver shaft turns and applies torque in one direction and (ii) connect the driver shaft and the driven shaft in all other modes of operation. Additionally it should be appreciated that the direction-sensing roller clutch 24 of the present example can be reversed to provide torque transfer unless an input rotated in a positive direction and applied a positive torque.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A roller clutch comprising:
an outer race;
an inner race;
a first engagement member situated between the outer race and the inner race;
a second engagement member situated between the outer race and the inner race; and
an electromagnetic mover to be energized or de-energized,
wherein the first engagement member is configured to engage the outer race and the inner race to transmit torque between the outer race and the inner race in response to (i) the electromagnetic mover being energized and (ii) the inner race applying negative torque to the first engagement member while the outer race applies positive torque to the first engagement member, and
wherein the second engagement member is configured to contact the outer race and the inner race to transmit torque between the outer race and the inner race in response to the inner race applying positive torque to the second engagement member while the outer race applies negative torque to the second engagement member.

2. The roller clutch of claim 1, further comprising an actuator configured to move the first engagement member into contact with at least one of the outer race and the inner race.

3. The roller clutch of claim 2, wherein the first engagement member is biased away from engagement with at least one of the outer race and the inner race by a first spring.

4. The roller clutch of claim 3, wherein the second engagement member is biased toward engagement with the outer race and the inner race by a second spring.

5. The roller clutch of claim 2, wherein electromagnetic mover is energized in response to the inner race turning in a positive direction and de-energized in response to the inner race turning in a negative direction.

6. The roller clutch of claim 5, wherein the actuator includes a paddle formed from a ferromagnetic material radially aligned with the electromagnetic mover.

* * * * *